United States Patent [19]

Archer et al.

[11] Patent Number: 4,667,467

[45] Date of Patent: May 26, 1987

[54] METHOD FOR ENERGY CONVERSION

[75] Inventors: David H. Archer, Pittsburgh; James R. Hamm, Murrysville; Edward J. Vidt, Churchill Boro, all of Pa.

[73] Assignee: Westinghouse Electric Corp., Pittsburgh, Pa.

[21] Appl. No.: 741,091

[22] Filed: Jun. 4, 1985

[51] Int. Cl.[4] .............................................. F02G 3/00
[52] U.S. Cl. .................................. 60/39.02; 60/39.12; 48/202
[58] Field of Search ..................... 48/197 R, 202, 206, 48/209, 210; 60/39.12, 39.02

[56] References Cited

U.S. PATENT DOCUMENTS

| 3,020,715 | 2/1962 | Thomsen | 60/39.12 |
|---|---|---|---|
| 3,798,898 | 3/1974 | Delahaye | 60/39.12 |
| 3,804,606 | 4/1974 | Archer et al. | 48/206 |
| 3,882,671 | 5/1975 | Nebgen | 60/39.02 |
| 3,969,089 | 7/1976 | Moss et al. | 48/197 R |
| 4,132,065 | 1/1979 | McGann | 60/39.02 |
| 4,150,953 | 4/1979 | Woodmansee | 48/197 R |
| 4,193,259 | 3/1980 | Muenger et al. | 60/39.12 |
| 4,202,167 | 5/1980 | Suggitt et al. | 48/197 R |

Primary Examiner—Barry S. Richman
Assistant Examiner—Joye L. Woodard
Attorney, Agent, or Firm—R. S. Lombard

[57] ABSTRACT

A method for electric power production or cogeneration of electrical power and process heat and/or steam that integrates a solid carbonaceous fuel gasification system and gas turbine system. Fuel gas produced in the gasification system is combusted and the combustion gases used in the gas turbine system. The gas turbine system uses water spray intercooling of the compressor or compressors, with air-water mixture from the compressor used in the gasification system, while hot exhaust gas from the turbine system has heat recuperated therefrom and is used to produce steam, which is also used in the gasification system.

7 Claims, 3 Drawing Figures

METHOD FOR ENERGY CONVERSION

The present invention is a system for the generation of electrical energy and steam and/or process heat using a solid carbonaceous fuel gasification unit in cooperation with a gas turbine. Water spray intercooling of the gas turbine compressor provides an air-water mixture for use in the gasifier, as well as in the gas turbine combustor.

Conventional gasification systems that provide fuel gas to a conventional combined cycle power plant with oxygen from air separation for oxidant supply, fuel gas cooling, and wet absorptive gas desulfurization, are at best marginally lower in cost than electric power from conventional coal fired steam plants with stack gas desulfurization. The need, therefore, exists for a simplified fluidized bed gasification process which is integrated with a gas turbine using the turbine air compressor unit for oxidant supply, and providing hot, desulfurized, low particulate-content gas to a gas turbine system that incorporates recuperation, reheat and water spray intercooling in the air compressor. Such as integrated system, using recuperation, reheat, and water spray intercooling should provide lower cost, more efficient electric power production.

There are three approaches to the use of evaporative cooling of air during compression in a gas turbine to improve the performance of the gas turbine cycle, i.e., wet compression, evaporative intercooling, and transpiration cooling. In wet compression, finely divided water droplets are introduced into the air stream at the compressor inlet and the heat of compression of the air is absorbed as the liquid water droplets evaporate. In evaporative intercooling, water is sprayed into the air stream at intervals during compression. In transpiration cooling, water on the surfaces in contact with the air evaporates, cooling both the surfaces and the air.

In all these approaches, there are three factors which tend to improve the performance of the gas turbine cycle. First, the work of compression of the air is reduced. Second, the injected water is evaporated over a range of pressure, so that the water vapor is compressed over only part of the pressure ratio whereas it expands in the turbine over the full pressure ratio. Finally, the temperature of the compressed air is lowered so that a greater portion of reject heat from the turbine exhaust can be absorbed in air preheat.

It is an object of the present invention to provide a system for electric power and/or process heat/steam production that has an integrated coal gasification system and fuel gas turbine system, the latter having water spray intercooling of the compression unit, recuperation, and reheat, all of which provide efficient electric power production.

SUMMARY OF THE INVENTION

A system for the production of electrical energy and/or process heat/steam having an integrated gasification system and gas turbine system. Solid carbonaceous fuel, such as coal, is gasified in a gasifier and the hot fuel gases produced, after removal of solids, are used in a gas turbine system. The gas turbine system has at least one compression unit and one or two expander units, with water spray cooling of the compression unit. A portion of the hot air-water mixture from the compression unit is directed to the gasifier system for use therein, and a further portion is directed through a heat recuperator to the gas turbine combustor. Hot exhaust gases from the gas turbine system pass through the heat recuperator and then to a steam generation system that produces high pressure steam that is also directed to the gasifier system for use therein. Low pressure steam produced in the steam generation system is used in cooling the expansion unit of the gas turbine system.

The integrated coal gasification system and gas turbine system, with heat recuperation, and expansion gas reheat, provides low cost high efficiency electric power production.

DETAILED DESCRIPTION

The present invention provides a system for electric power production that permits coal gasification, preferably with dolomitic gas desulfurization, to be combined with a recuperative, reheat gas turbine with wet compression, so that the water cooled air for recuperative gas turbine combustion also provides part of the air-water mixture needed for coal gasification and for sulfation of sulfided dolomite. The system provides environmentally acceptable emissions of coal ash and sulfated dolomite simultaneous with low sulfur products of combustion from the gas turbine in a low cost and highly efficient electric power production plant.

Figure 1:
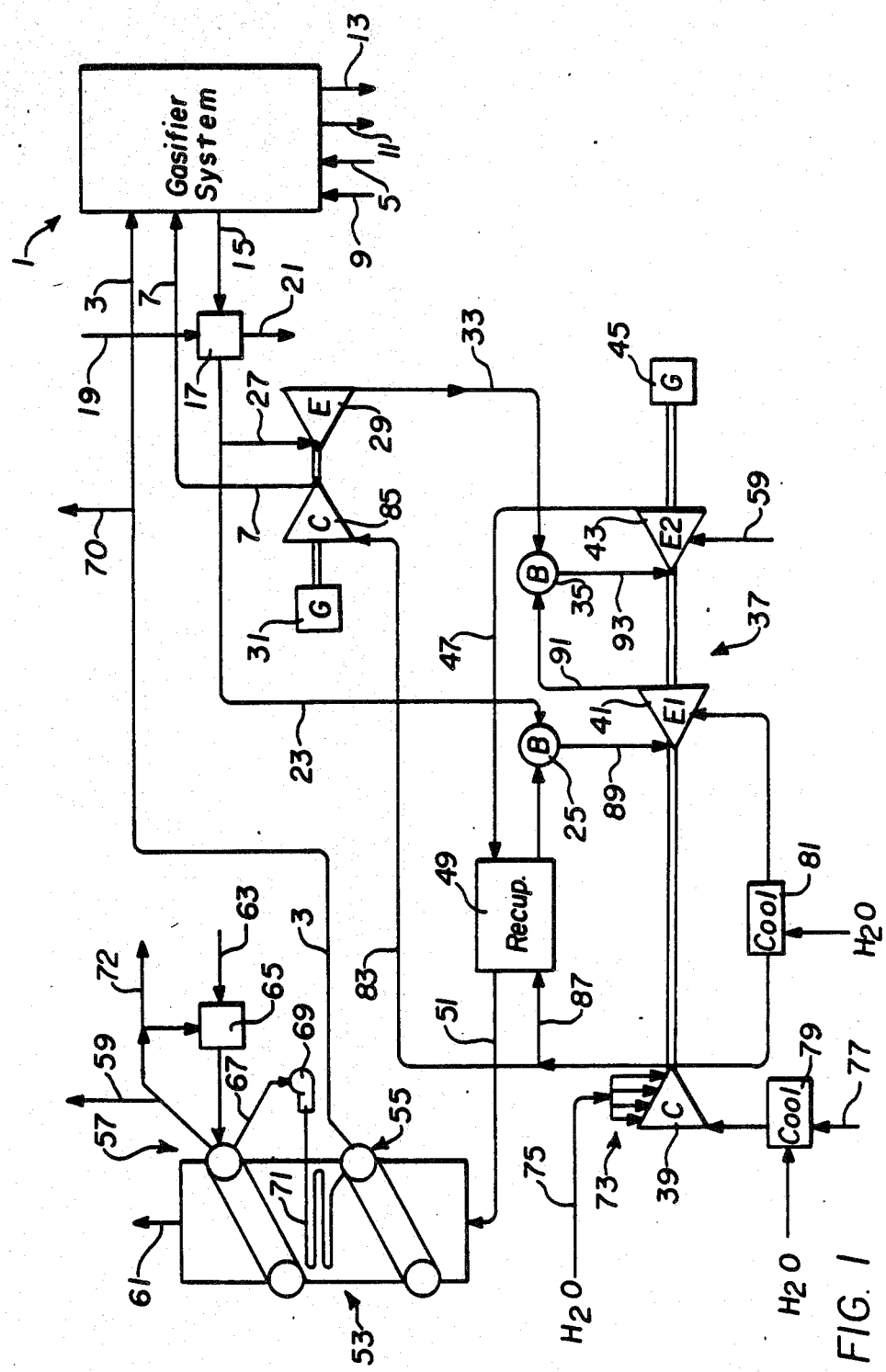
FIG. 1 schematically illustrates an integrated system of the present invention using a single compression unit of a gas turbine system, with interstage cooling.

A schematic illustration of the recuperated, reheated gas turbine with water spray intercooling and integrated coal gasification system is provided in FIG. 1. The gasifier system 1 has a line 3 for charging steam thereto, a line 5 for charging coal or other solid carbonaceous fuel, a line 7 for charging a combustion air-water mixture, and a line 9 for charging of a solid absorbent for sulfur or other impurities in the coal. Solid residue from the gasifier system is discharged through line 11, while the fuel gas produced in gasifier system 1 has solids removed therefrom, the solids discharged through line 13, while the fuel gas is discharged through line 15. The high pressure fuel gas is cooled in a water guenching apparatus 17, to which water is charged through line 19, and from which excess water may be discharged through line 21. The primary reason for quenching the fuel gas is to reduce the supply temperature of the fuel gas in line 23 to a high pressure combustion unit 25, or burner, downstream thereof. A portion of the high pressure fuel gas is directed through line 27 to an expander 29, which can produce electrical energy through a cooperating generator 31, and from the expander 29, at a lower pressure, through line 33 to a low pressure combustion unit 35, or burner. Hot gases from the high pressure combustion unit 25 and from the low pressure combustion unit 35 are used in a gas turbine system 37. In the gas turbine system 37 illustrated, a single spool design is shown with a compression unit 39 and dual expansion stages. An air cooled expansion stage 41 and a steam cooled expansion stage 43, along with compression unit 39 operate a generator 45 for production of electrical power.

Hot exhaust from the turbine system 37 is directed through line 47 to a heat recuperator 49, and then through line 51 to a steam generation system, such as a waste heat boiler 53. In the waste heat boiler 53, a high pressure evaporator 55 is provided which produces a high pressure steam flow to line 3, that is fed to the gasifier system 1. A low pressure evaporator 57 is also provided in waste heat boiler 53 which produces a low pressure stream flow to line 59, a portion of which is charged to the steam cooled expansion stage 43 of the gas turbine system 37. Exhaust gases from the waste heat boiler 53 are discharged through line 61. Boiler feedwater is fed to the low pressure evaporator 57 through line 63, having a direct feedwater heater 65 thereon, which receives a portion of the low pressure steam flow, and to the high pressure evaporator 55 through line 67, to a pump 69, and through high pressure economizer coils 71 in the boiler system.

The hot exhaust from the gas turbine system 37 is thus used in the waste heat boiler 53 to produce steam for the gasifier system 1. Excess high pressure steam raised in the boiler 53 from line 3, through outlet 70, or excess low pressure steam from line 59, through outlet 72, can be used in cogeneration applications as a source of process steam; while the warm combustion gases from line 61 can be used as a source of process heat in cogeneration applications.

In the present invention, water spray intercooling of the compression unit of the gas turbine system is used. As illustrated, a plurality of sprays of water 73, from a line 75, are charged to the compression unit 39. Air to the gas turbine system 37 through line 77 also has water injected thereto, at an evaporative spray cooler 79, and then the air is passed to the compression unit 39. An air cooler or a spray chamber 81, to which water is added, is provided between the compression unit 39 and the air cooled expansion stage 41 of the gas turbine system 37.

A portion of the hot air, containing water, from the compression unit 39 is passed through line 83 to a compressor 85, which cooperates with expander 29, and is then passed to line 7 for use in the gasifier system 1. The main portion of the hot air-water mixture in line 83 may be directed through line 87, through the recuperator 49 and then to the high pressure combustion unit 25.

Combustion gases from the high pressure combustion unit 25 flow through line 89 to the air cooled expander 41, while gases from the air cooled expander 41 flow through line 91 to the low pressure combustor unit 35, with the combustion gases from the low pressure combustion unit 35 passed through line 93 to the steam cooled expander 43.

Figure 2:
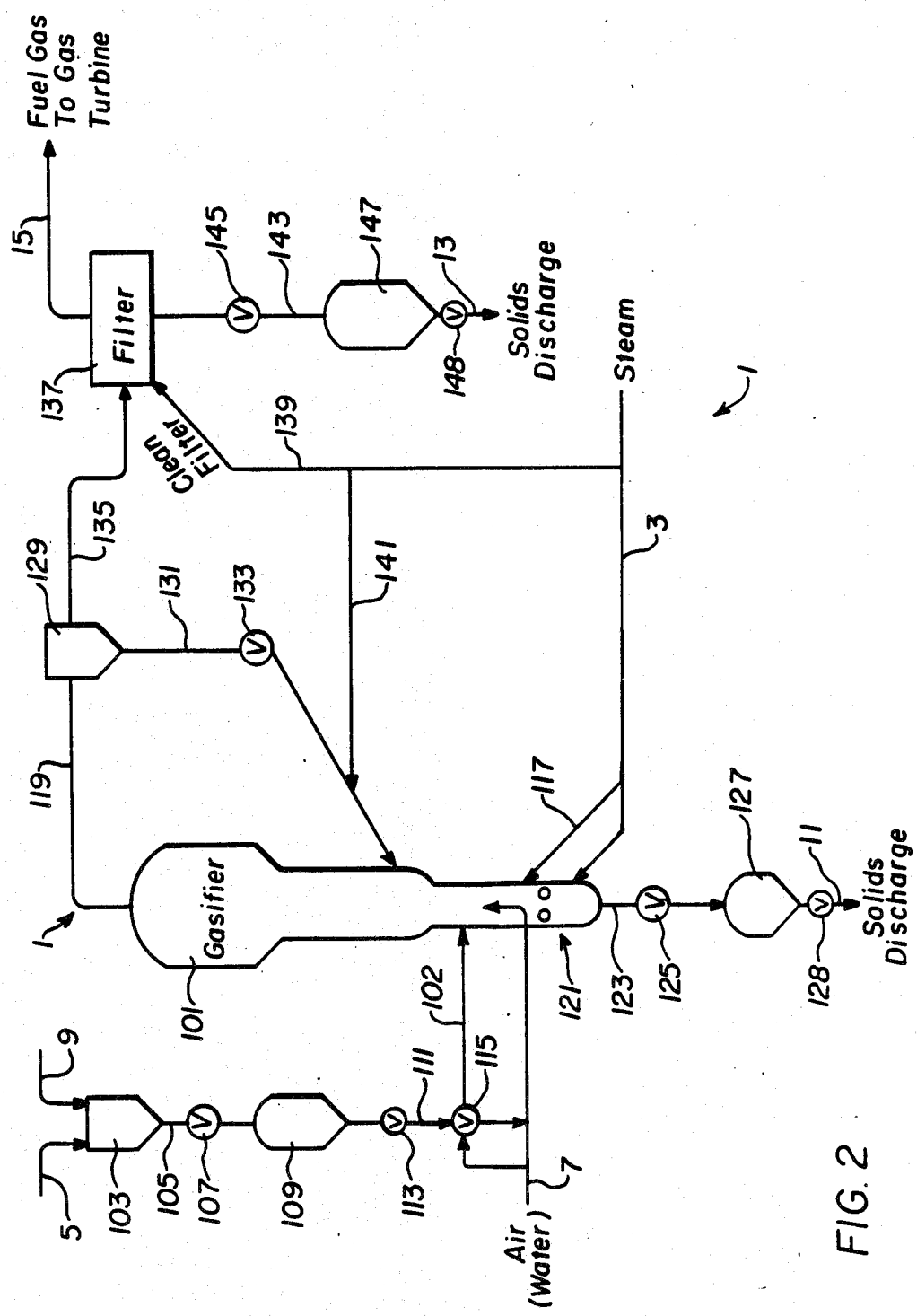
FIG. 2 schematically illustrates a coal gasifier system for use with the integrated system of the present invention.

A schematic illustration of an embodiment of a gasifier system 1 usable with the present cogeneration system is given in FIG. 2. A gasifier for a solid carbonaceous fuel 101 has a mixture of solid carbonaceous, fuel such as coal, and an absorbent for sulfur charged thereto through line 102, using a portion of the air containing moisture flowing through line 7 as the feed stream. The coal from line 5 and sulfur absorbent from line 9 are preferably combined in a hopper 103 and fed through line 105, containing a valve 107, to a lock hopper 109, and pressurized therein. From the lock hopper 109, the solid mixture is fed through line 111, containing a valve 113, to a feeder 115. In the feeder 115, the solids mixture is admixed with a portion of the air-water mixture from the turbine air compressor and fed to the gasifier 101. The remaining portion of the air-water mixture from line 7 flows through a separate port into the gasifier 101. In the gasifier 101, which may be of conventional design, the solids mixture is contacted, at elevated temperatures, with both the air-water mixture charged through line 7 and the steam charged through line 3, which line 3 may have a branch line 117 or plurality of such branch lines. In the gasifier 101, the solid carbonaceous fuel is processed to produce a fuel gas that is discharged through line 119. Ash and sulfided limestone, where limestone is used as the sulfur absorber, are contacted with the air-water mixture from line 7, and steam from line 3, for conversion to sulfated limestone, for carbon burnup, and for cooling in the bottom 121 of the gasifier 101. Ash and spent sulfur absorber are removed from the gasifier 101 through line 123, containing valve 125, and then passed to a lock hopper 127. From the lock hopper, the spent solids are discharged from the gasifier system 1 through line 11 containing valve 128. The hot product fuel gas from line 119 passes to a cyclone 129 or other solids separator, to remove solids therefrom that are returned, through line 131, containing valve 133, to the gasifier 101. The fuel gas is discharged from the cyclone 129 through line 135 and passed to a filter means 137. After removal of any residual solids through the use of ceramic or metallic filters, the solids-free fuel gas is discharged from the gasifier system 1 through line 15. Steam branch line 139 is provided from line 3 to pass a portion of steam to the filter means for steam cleaning of the same, while an off branch line 141 from line 139 feeds steam to line 131 for use in recycling fines to the gasifier 101. The solids from filter 137 pass through line 143, containing valve 145, to a dust lock hopper 147 and are then discharged from the gasifier system through line 13 containing valve 148.

In a preferred gasifier system, the solid carbonaceous fuel is coal, lignite, peat, or biomass, and the sulfur absorber is dolomite or limestone. In removing sulfur from the gaseous mixture produced in the gasifier, the dolomite or limestone reacts with the sulfur components of the coal to produce a sulfided mixture. The sulfided mixture is, upon contact with steam and air in the lower portion of the gasifier, converted to a sulfated mixture which is more environmentally acceptable.

Figure 3:
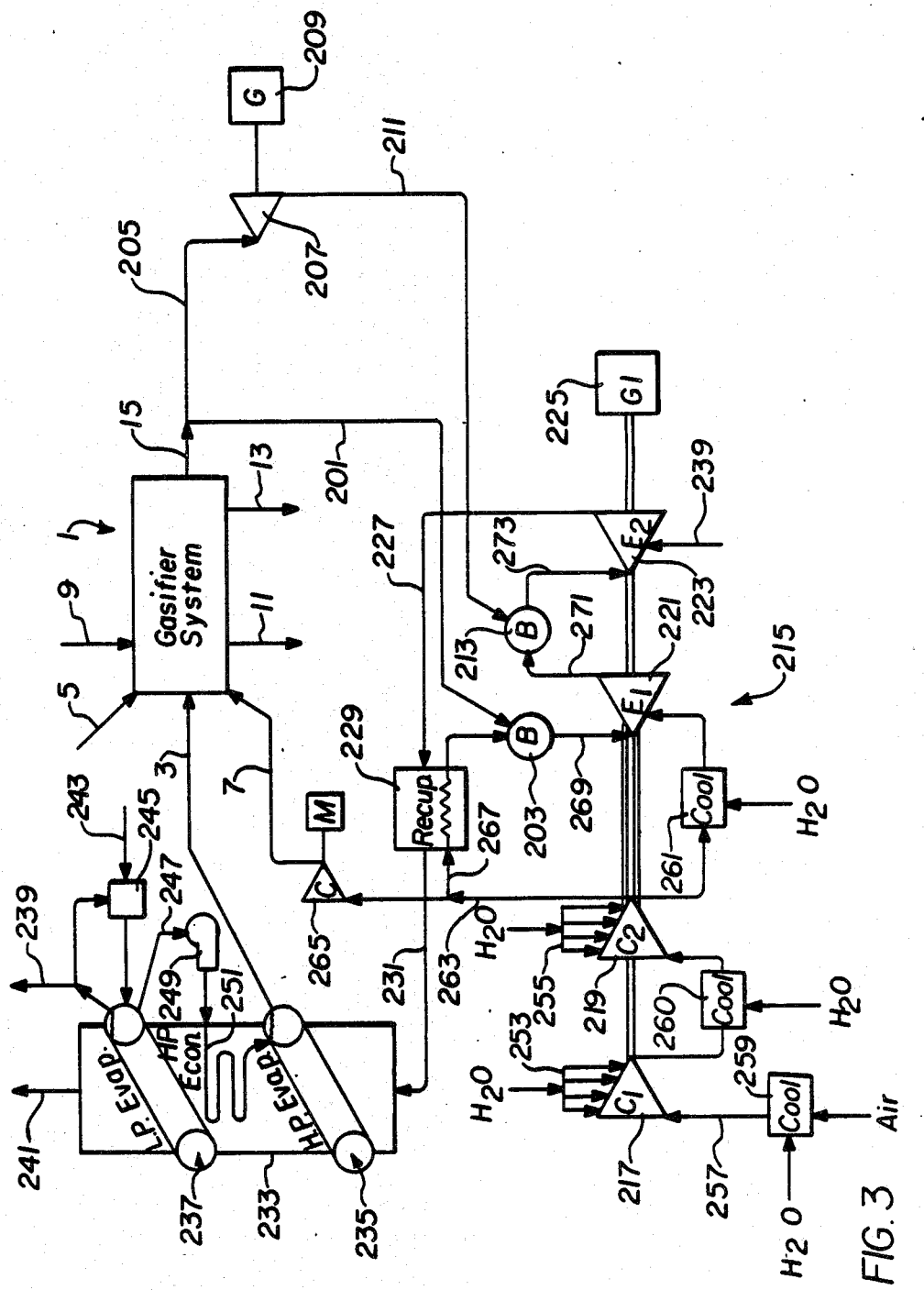
FIG. 3 schematically illustrates another embodiment of an integrated system of the present invention using dual compression units of a gas turbine system with interstage cooling.

A schematic illustration of another embodiment of the recuperated, reheated gas turbine with water spray intercooling and integrated coal gasification system is provided in FIG. 3. The gasifier system 1, has steam charged thereto through line 3, coal or other solid carbonaceous fuel through line 5, combustion air-water mixture through line 7 and an absorbent for suflur or other impurities in the coal through line 9. Solid residue from the gasification process is discharged through line 11, while the fuel gas has suspended solids removed therefrom through line 13, with the fuel gas then discharged from the gasifier system 1 by means of line 15. The fuel gas in line 15 is at high pressure. A first portion of the high pressure fuel gas is carried by line 201 to a high pressure combustion unit 203, while a second portion is carried by line 205 to an expander 207, which can produce electrical energy through a cooperating generator 209, and from the expander 207, at a lower pressure, through line 211, to a low pressure combustion unit 213. Hot gases from the high pressure combustion unit 203 and low pressure combustion unit 213 are utilized in a gas turbine system 215.

In the gas turbine system 215 illustrated, a two spool design is shown, with the two units of the compression, 217 and 219 operating at different rotational speeds, with the system having an air cooled expansion stage 221 and a steam cooled expansion stage 223, the turbine system operating a generator 225 for production of electrical power.

Hot exhaust from the turbine system 215 is directed through line 227, through a heat recuperator 229, and then through line 231 to a waste heat boiler system 233. In the waste heat boiler 233, a high pressure evaporator 235 is provided which produces a high pressure steam flow to line 3 which is fed to the gasifier system 1, while a low pressure evaporator 237 is provided which produces a low pressure steam flow to line 239 which is charged to the steam cooled expansion stage 223 of the gas turbine system 215. Exhaust from the waste heat boiler is discharged through line 241. Boiler feedwater is fed to the low pressure evaporator 237 through line 243 having a direct feedwater heater 245 thereon and to the high pressure evaporator 235 through line 247, to a pump 249, and through high pressure economizer coils 251 in the boiler to the high pressure evaporator 235. The hot exhaust from the gas turbine system 215 is thus used in the waste heat boiler 233 to produce steam for the gasifier system 1.

In this embodiment also, water spray intercooling of the compression stages of the gas turbine cycle is used. As illustrated, a plurality of sprays of water, through injection lines 253 to the first stage of compression unit 217, and through lines 255 to the second stage compression unit 219, are charged to the gas turbine system 215. Air to the gas turbine system 25 through line 257, has water also injected thereto at an evaporative spray cooler or contact cooler 259 and then the air is passed to the compression stage 217. A spray or contact cooler chamber 260 is also provided between the compression stages 217 and 219 to which water is added, and a further spray chamber 261 is provided between the compression stage 219 and air cooled expansion stage 221, to which further water is added, to provide a medium for vane and blade cooling.

A portion of the hot air, containing water, from the compression stage 219 of the gas turbine system 215 is passed through line 263 to an auxiliary compressor 265 having a cooperating motor, and then is passed to line 7 for use in the gasification system 1. The main portion of this hot air-water mixture in line 263 is directed through line 267, through the recuperator 229 and then to the high pressure combustion unit 203.

Combustion gases from the high pressure combustion unit 203 flow through line 269 to the air cooled expander 221, while gases from the air cooled expander 221 flow through line 217 to the low pressure combustion unit 213. The combustion gases from the low pressure combustion unit 213 are passed through line 273 to the steam cooled expander 223.

The operation of the present process, using the embodiment of FIG. 3 would be effected as follows. Fuel gas, after solids removal, would be discharged from the gasifier system through line 15, at a temperature of about 1000° C. and pressure of 280 psia (pounds per square inch absolute). A first portion of the gases at these conditions would be passed through line 201 to the high pressure combustion unit 203. A second portion of the gases would be passed through line 205 to the expander 207 and depressurized and cooled therein, with lower pressure fuel gas, at a temperature of about 750° C. and pressure of 100 psia passed through line 211 to the low pressure combustion unit 213.

Hot exhaust gases from the gas turbine system 215 would be discharged through line 227 at a temperature of about 550° C. to the recuperator 229, where it is cooled to about 320° C. and passed through line 231 to the waste heat boiler system 233 for production of steam. High pressure steam is produced in the high pressure evaporator 235, at a temperature of about 210° C. and a pressure of 300 psia. Boiler feed water at a temperature of about 15° C. and 100 psia pressure is fed to the feedwater heater 245. The low pressure steam in line 239 would be at a temperature of about 165° C. and pressure of 100 psia, with a portion thereof fed to the low pressure expansion unit 223, while the exhaust gas from the waste heat boiler, in line 241 would be at a temperature of about 150° C.

In the gas turbine system 215, humidified air, at about 12° C., 14.55 psia pressure, and 90 percent humidity, is charged through line 257 to the compression stage 217, with water fed to spray chamber 260 to maintain a 90 percent humidity to compression stage 219. Air-water mixture in line 263 would be at a temperature of about 180° C. and 262 psia pressure, and after compression in auxiliary compressor 265, would pass through line 7 to the gasifier system 1 at a temperature of about 200° C. and 300 psia pressure. The side stream of air-water mixture in line 267 would be heated, by recuperation of heat from the hot exhaust gases from the gas turbine system 215, in recuperator 229 to a temperature of about 510° C., and at a pressure of about 257 psia, and passed to the high pressure combustion unit 203. Combustion gases in line 269 from the high pressure combustion unit 203 would be at a temperature of about 1100° C. Gases in line 217 from the air cooled expander to the low pressure combustion unit 213 would be at a temperature of about 775° C. and 100 psia pressure, while the hot combustion gases from the low pressure combustion unit 213, in line 273 to the low pressure expansion unit would be at a temperature of about 980° C.

The present system provides a low cost, efficient electric power production, using a coal gasifier and integrated gas turbine, that provides environmentally acceptable emissions of coal ash and sulfated dolomite or limestone and low sulfur products of combustion from the gas turbine.

What is claimed is:

1. A process for generation of electrical energy and steam using an integrated solid carbonaceous fuel gasification system to produce a fuel gas and a gas turbine system that uses said fuel gas for electrical power and steam production characterized in that said process comprises:
   gasifying a solid carbonaceous fuel in a gasifier system using steam and an air-water mixture to produce a fuel gas;
   removing particulate material from the fuel gas;
   combusting a portion of said fuel gas in a high pressure combustion unit, to produce high pressure hot combustion gases;
   depressurizing the remainder of said fuel gas and combusting the same in a low pressure combustion unit to produce low pressure hot combustion gases;
   using the hot combustion gases in a gas turbine system containing at least one compression unit, and a high pressure expansion unit and low pressure expansion unit, with the high pressure hot combustion gases directed to the high pressure expansion unit and the low pressure hot combustion gases directed to the low pressure expansion unit, to operate a generator for electrical power production, with discharge of hot exhaust gases therefrom;

effecting water spray intercooling of the compression unit of the gas turbine system with production therein of an air-water mixture;

passing at least a portion of said air-water mixture to said gasifier system as the air-water mixture used therein;

passing said hot exhaust gas from the gas turbine system to a steam generation system to produce steam therein;

passing a portion of the steam, produced in the steam generation system from said hot exhaust gas, to said gasifier system as the steam used therein; and passing a further portion of said steam, produced in the steam generation system from said hot exhaust gas, to the low pressure expansion unit of the gas turbine system for cooling thereof.

2. The process as defined in claim 1 wherein exhaust gases from the high pressure expansion unit of the gas turbine system are directed to said low pressure combustion unit.

3. The process as defined in claim 2 wherein the gas turbine system has first and second compression units and water spray intercooling is effected in both said compression units.

4. The process as defined in claim 3 wherein an air-water mixture from said first compression unit is passed through said second compression unit, and wherein said portion of air-water mixture passed to the gasified system is discharged from said second compression unit.

5. The process as defined in claim 1 wherein heat is recuperated from said hot exhaust gas after discharge from the gas turbine system and prior to passage to the steam generation system.

6. The process as defined in claim 1 wherein the gasifier system has a solid absorbent added thereto to absorb sulfur from said solid carbonaceous fuel.

7. The process as defined in claim 6 wherein said solid absorbent is selected from the group consisting of dolomite and limestone.

* * * * *